United States Patent

Keep et al.

[11] Patent Number: 5,229,015
[45] Date of Patent: Jul. 20, 1993

[54] LIQUID SEPARATOR

[75] Inventors: Steven K. Keep; Garfield A. Wood, III, both of Tulsa, Okla.

[73] Assignee: Nautus, Inc., Tulsa, Okla.

[21] Appl. No.: 887,222

[22] Filed: May 18, 1992

Related U.S. Application Data

[63] Continuation of Ser. No. 708,856, May 31, 1991, abandoned.

[51] Int. Cl.⁵ .............................................. C02F 1/40
[52] U.S. Cl. ................................ 210/799; 210/800; 210/265; 210/287; 210/519; 210/540; 210/DIG. 5
[58] Field of Search ............... 210/263, 265, 287, 291, 210/538, 539, 540, 799, 519, 800, DIG. 5

[56] References Cited

U.S. PATENT DOCUMENTS

| | | | |
|---|---|---|---|
| 1,756,862 | 4/1930 | Holford | 210/263 |
| 3,651,944 | 3/1972 | Shuttleworth | 210/265 |
| 3,844,743 | 10/1974 | Jones | 210/DIG. 5 |
| 3,847,813 | 11/1974 | Castelli | 210/232 |
| 3,853,753 | 12/1974 | Jones | 210/DIG. 5 |
| 3,925,202 | 12/1975 | Hirs | 210/799 |
| 3,957,656 | 5/1976 | Castelli | 210/521 |
| 4,042,512 | 8/1977 | McCarthy et al. | 210/519 |
| 4,059,517 | 11/1977 | Strahorn et al. | 210/540 |
| 4,385,986 | 5/1983 | Jaisinghani et al. | 210/538 |
| 4,601,825 | 7/1986 | Eriksson | 210/DIG. 5 |
| 4,717,481 | 1/1988 | Strehle et al. | 210/265 |
| 4,722,800 | 2/1988 | Aymong | 210/802 |
| 4,802,978 | 2/1989 | Schmit et al. | 210/104 |
| 4,865,734 | 9/1989 | Schulz | 210/291 |
| 4,897,206 | 1/1990 | Castelli | 210/791 |

FOREIGN PATENT DOCUMENTS

| | | |
|---|---|---|
| 3121117 | 12/1982 | Fed. Rep. of Germany . |
| 3346931 | 7/1985 | Fed. Rep. of Germany . |
| 683773 | 9/1979 | U.S.S.R. . |

OTHER PUBLICATIONS

Perry's Chemical Engineer's Handbook, 6th ed, pp. 18-23, 1984.
Manual on Disposal of Refinery Wastes vol. 1 7th edition pp. 17-24.
Industrial Water Pollution Control, 2nd edition, authored by W. Wesley Eckenfelder, Jr. pp. 69-71 and 83.

*Primary Examiner*—Stanley S. Silverman
*Assistant Examiner*—Christopher Upton
*Attorney, Agent, or Firm*—Head & Johnson

[57] ABSTRACT

A separator device to separate a mixture of immiscible liquids of different densities wherein one of said liquids is in a discontinuous phase. The separator device includes a container having an inlet for the mixture of immiscible liquids and an outlet for removing one of the liquids after separation. A drain is provided to remove the discontinuous phase liquid after separation. Randomly arranged, loosely packed, coalescing medium within the container encourages coalescence and agglomeration of the discontinuous phase liquid.

4 Claims, 2 Drawing Sheets

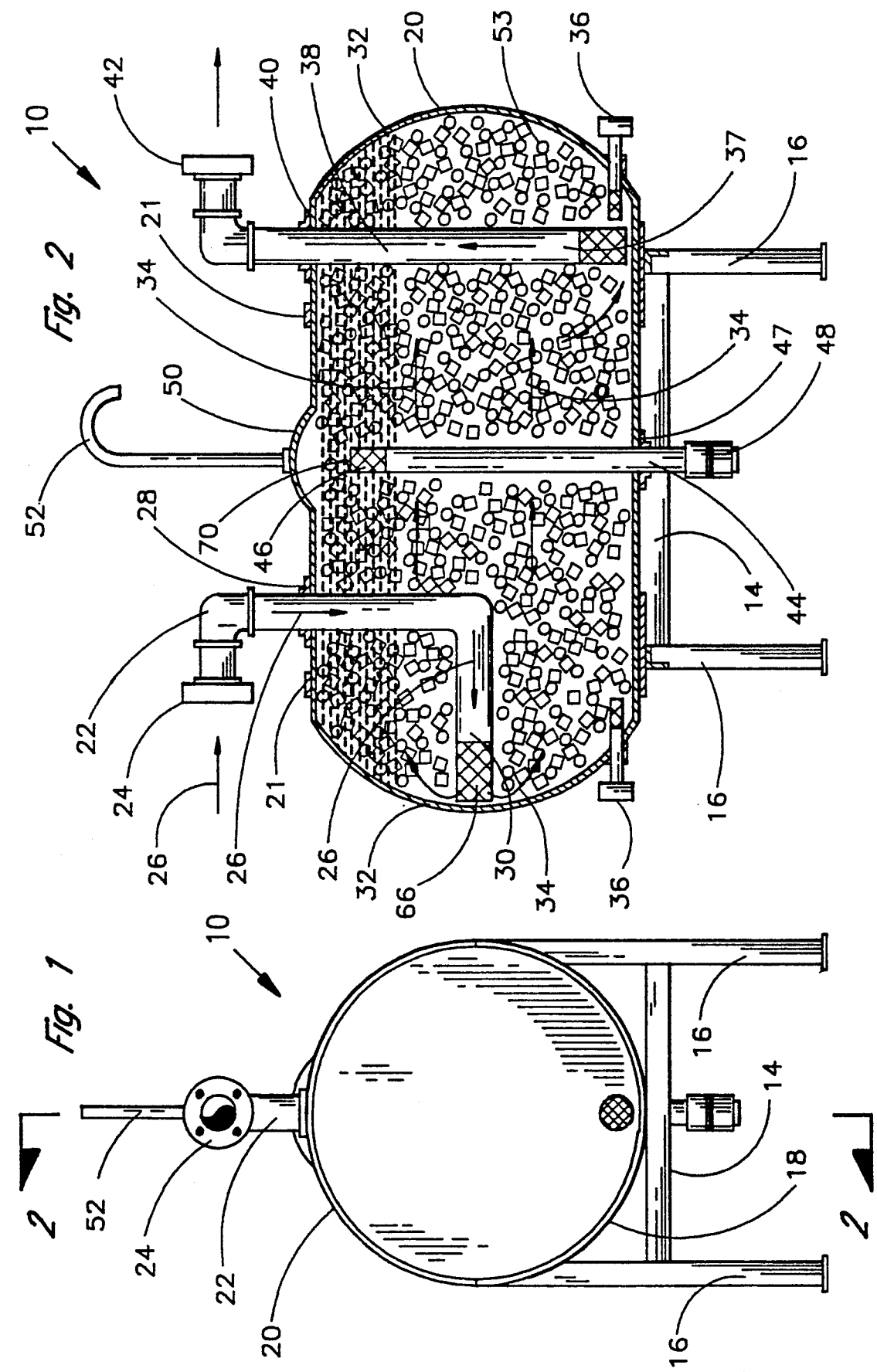

LIQUID SEPARATOR

This is a continuation of copending application Ser. No. 07/708,856, filed on May 31, 1991, now abandoned.

BACKGROUND OF THE INVENTION

1. Field of the Invention

The present invention is directed to a gravity type liquid separator to separate a mixture of liquids of different densities. In particular, the present invention is directed to a gravity type liquid separator having a coalescing medium within the separator container.

2. Prior Art

The use of gravity type liquid separators to separate a mixture of liquids of different densities is longstanding.

An important use of these liquid separators is in treatment of waste water discharge. Increasingly, governmental regulations specify the maximum amount of hydrocarbons that may be present in waste water discharge. The acceptable amount might typically be 10-15 parts per million (PPM). Other uses include removal of animal fat from water in food processing applications and removal of chemicals from water in industrial applications.

In the simplest separators, an open tank or holding area is utilized. An example would be an oil/water separator where oil is floated to the surface of the tank. The lighter than water oil globules rise through the liquid mixture. The free oil is then skimmed off.

Other separator designs include plates which are incorporated within the container or tank. It is known that separation of liquids is enhanced by using a coalescing process. One example is seen in Schmit et al. (U.S. Pat. No. 4,802,978) which provides a forced flow type oil/water separator utilizing arranged parallel plates with corrugated surfaces. Castelli (U.S. Pat. No. 4,897,206) discloses corrugated separator plates having corrugations running in orthogonal directions. Bleed holes are provided in both the crests and the valleys of the plates.

A further separator design incorporates two stages. As an example, Aymong (U.S. Pat. No. 4,722,800) discloses a separator having two chambers, a small inlet chamber having a baffle to reduce and deflect inlet turbulence, and a relatively large separator chamber.

All of the prior art separators which include a coalescing medium include structured plates or other medium which have a fixed structure and form.

Accordingly, it is a principal object and purpose of the present invention to provide a liquid separator having a random packing coalescing medium.

It is a further object and purpose of the present invention to provide a liquid separator having a coalescing medium that is loosely packed and not fastened to the tank or container.

It is an additional object and purpose of the present invention to provide a coalescing medium within a separator having the maximum amount of surface area within a unit of volume.

It is a further object and purpose to provide a liquid separator having a coalescing medium that is buoyant in water to facilitate cleaning by flushing the separator with clear water.

SUMMARY OF THE INVENTION

A gravity-type liquid separator of the present invention is suitable for separation of immiscible liquids having different specific gravities wherein one of the liquids is discontinuous and made up of discrete droplets.

The separator may include a stand having legs in an arcuate cradle. A substantially cylindrical container sits within the cradle oriented with a horizontal axis. Straps secure the tank to the stand.

The influent mixture of the immiscible liquids to be separate will enter the separator through an inlet pipe. The inlet pipe passes through an opening in the container and terminates in an open end within the tank. The flow of the influent mixture as it exits the end of the inlet pipe is directed toward on end of the tank. The ends of the tank have interior convex surfaces which serve to dissipate the kinetic energy of the influent mixture moving into the tank and to direct the flow in a reverse, horizontal direction.

Cleaning drains may be located near the base of the tank and are normally in the closed position. When it is necessary to empty the tank or flush out accumulated solids, the drain valves may be opened.

An outlet pipe commences within the tank at an open end near the base and passes through an opening in the tank. The outlet pipe terminates in an outlet nozzle. In an oil/water separator the outlet pipe would be used to remove the purified water.

A drain pipe has an open end near the upper end of the tank and passes downward through an opening in the tank. The drain pipe terminates in a valve outside of the tank. The separated oil would be removed through the drain pipe.

An air vent extends upward from the top of the tank and terminates in a tube having an open end.

The interior of the tank is filled with a coalescing medium which is randomly packed or distributed within the tank. The coalescing medium rests loosely within the tank and is not fixed or fastened to the tank.

In the present embodiment, the coalescing medium consists of a series of rings. Each ring is cylindrical in shape and has an open top and an open bottom. The circumferential surface of each ring contains a plurality of slots. Additionally, across the diameter of the rings, a series of ribs extend. The rings are either covered with or composed of polyproplyene, which is known to enhance the coalescing process.

The coalescing medium in the form of rings is prevented from entering the pipes within the tank. An inlet screen surrounds the end of the inlet pipe. An outlet screen surrounds the open end of the outlet pipe. Additionally, a drain screen surrounds the open end of the drain pipe.

The coalescing medium enhances the operation of the separator. Initially the difference in the specific gravity of the water and the oil causes the oil droplets to rise. Small oil droplets (generally smaller than 15 microns) combine into larger droplets about the coalescing medium. The use of the randomly packed, unfastened and unstructured packing medium has been found to provide an optimum amount of horizontal surface area for unit volume.

BRIEF DESCRIPTION OF THE DRAWINGS

FIG. 1 is a perspective, end view of a liquid separator constructed in accordance with the present invention;

FIG. 2 is a sectional view of a liquid separator constructed in accordance with the present invention taken along section line 2—2 of FIG. 1.

DETAILED DESCRIPTION OF THE PREFERRED EMBODIMENTS

Figure 3:
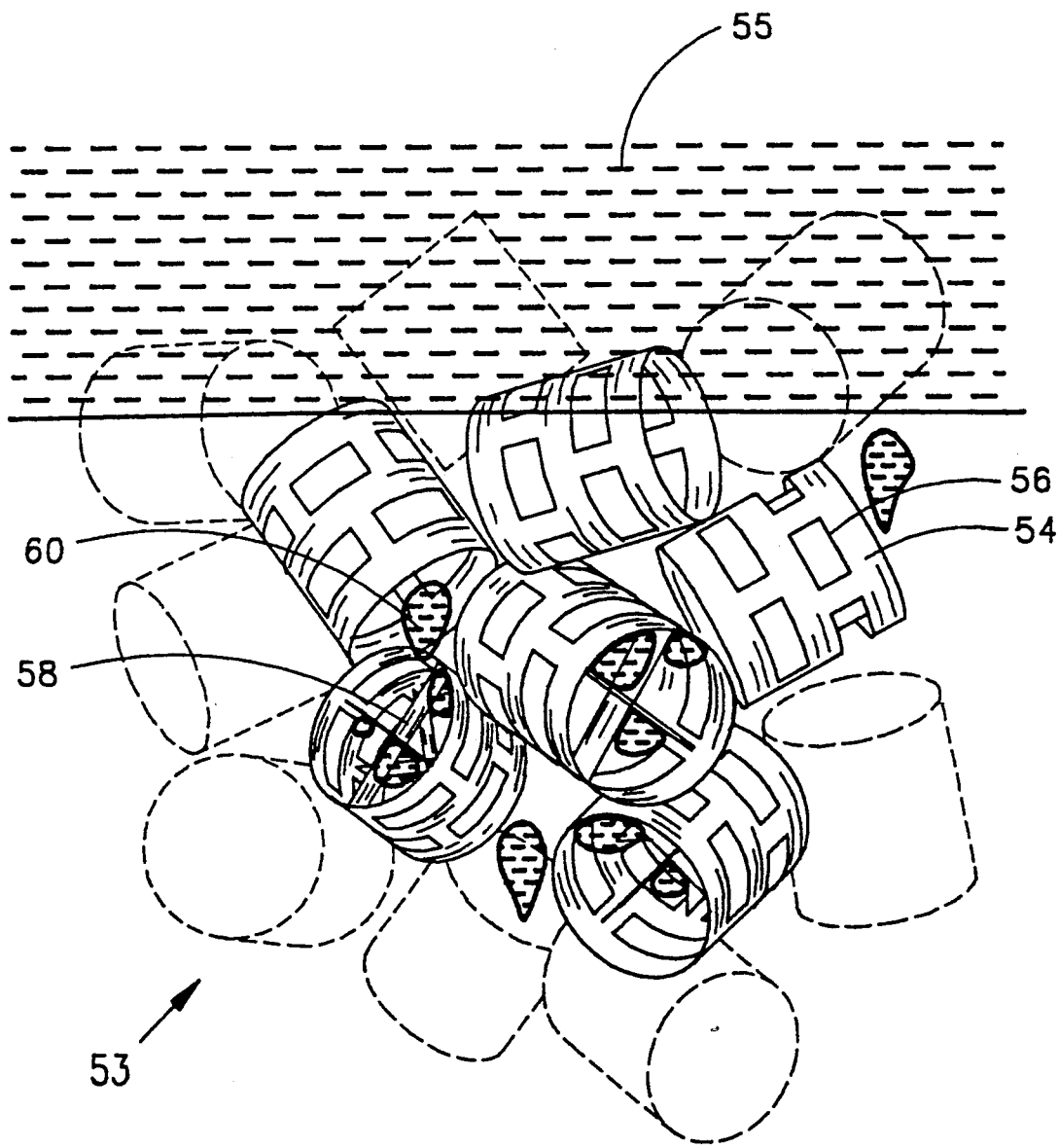
FIG. 3 is a perspective view of one form of coalescing medium which would be contained within the interior of the separator shown in FIG. 1.

Referring to the drawings in detail, FIG. 1 illustrates an end view of a gravity-type liquid separator 10 constructed in accordance with the present invention. The separator is suited for separation of various immiscible liquids having different specific gravities wherein one liquid is discontinuous and made up of discrete droplets. The separator is particularly suited for use as an oil/water separator wherein a discontinuous oil phase is separated from a continuous water phase.

The liquid separator may include a stand 14 having legs 16 and an arcuate cradle 18. It will be understood that other supporting framework might be utilized.

Within the cradle 18 is a substantially cylindrical container or tank 20. The tank 20 has its axis in a horizontal orientation. The tank 20 may be constructed of polyethylene or other non-metallic or metallic materials. The tank 20 ideally will be suited for containment of liquids which may be found in the hazardous waste field.

FIG. 2 is a sectional view of the separator 10 taken along section line 2—2. Straps 21 secure the tank 20 to the stand 14.

The influent mixture of immiscible liquids to be separated will enter the separator 10 through an inlet pipe 22 having an inlet nozzle 24. The arrows 26 indicate the direction of flow of the influent mixture into the tank 10.

The inlet pipe 22 passes through a opening 28 in the container 20 and terminates in an open end 30 within the tank.

As best seen in FIG. 2, the tank 20 will be fluid packed during operation. For clarity, the accumulated oil is illustrated by the dashed lines within the tank 20 wile the water in the tank is not shown.

It is known that inlet turbulence has a negative effect on the efficiency of the separator. In the present invention, this is addressed by directing the flow of the influent mixture as it exits at the end 30 of the inlet pipe toward one end 32 of the tank. The ends 32 have interior convex surfaces which serve to dissipate the kinetic energy of the influent mixture moving into the tank and direct the flow in a reverse, horizontal direction as best shown by arrows 34.

Cleaning drains 36 located near the base of the tank are normally in the closed position. In the event it is necessary to empty the tank or to flush out accumulated solids, the drain valves may be opened. The separator may be backwashed with water to dislodge and flush out solids.

An outlet pipe 38 commences within the tank at an open end 37 near the base, and passes through an opening 40 in the tank. The outlet pipe terminates in an outlet nozzle 42. In an oil/water separator, the outlet pipe 38 would be used to remove the purified water.

A drain pipe 44 has an open end 46 near the uppe end of the tank and passes through an opening 47 in the tank. Drain pipe terminates in a valve 48 outside of the tank 20. The separated oil would be drained through drain pipe 44. A container (not shown) could be placed under the valve 48 of the drain pipe 44, so that the valve may be left open. Alternatively, the valve could be placed in the closed position and periodically drained of the separated oil.

An air vent 50 extends upward from the top of the tank and terminates in a tube 52 having an open end.

The interior of the tank 20 is filled with a coalescing medium 53 which is randomly packed or distributed within the tank. The coalescing medium rests loosely within the tank and is not fixed or fastened to the tank in any way. In one embodiment, the coalescing medium consists of a series of rings 54. Alternately, coalescing medium having different shapes might be employed.

FIG. 3 is a simplified view of the interior of the tank 20 showing the rings 54. The separated oil is illustrated by the dashed lines 55. Each ring is cylindrical in shape and has an open top and an open bottom. The circumferential surface of each ring contains a plurality of slots 56. Additionally, across the diameter of the rings, a series of ribs 58 extend. The rings in the present embodiment are either covered with or composed of polyproplyene, which is known to enhance the coalescing process. Rings 54 of different sizes might be utilized although rings of 1" diameter are used in the present embodiment.

Since the rings themselves are buoyant in water, cleaning is facilitated since the rings will be agitated if the separator is emptied and then backwashed with water.

The coalescing medium enhances the operation of the separator in a number of ways. Initially, the difference in the specific gravity of the water and oil causes the oil droplets to rise. The coalescing medium of the present invention provides a substantial amount of horizontal surface area to intercept rising droplets. Small oil droplets (generally smaller than 15 microns) combine into larger droplets 60.

Additionally, the inertia of the droplets, either through inertial impaction, direct interception or coalescing from random directions, causes droplets to coalesce on the rings.

It is known that the removal of oil droplets by droplet rise onto a horizontal surface is a major factor in overall oil removal. Accordingly, the amount of horizontal surface area per unit volume is a critical factor. It will also be recognized that only the horizontal surface facing downward is effective for upward impingement of oil droplets. In one example, the use of the random packed coalescing medium provides over 25 square feet of downwardly facing horizontal surface area per cubic feet of media.

Returning to a consideration of FIG. 2, the coalescing medium in the form of rings 54 is prevented from entering pipes within the tank. An inlet screen 66 surrounds the end 30 of the inlet pipe 22. Outlet screen 68 surrounds the open end 37 of the outlet pipe 38. Drain screen 70 surrounds the open end 46 of the drain pipe.

In operation, the separator tank 20 is filled with clean water upon installation. The influent mixture of immiscible liquids is delivered to the separator through inlet nozzle 24 and inlet pipe 22 If the level of the inlet nozzle 24 is installed below the level of the source of the influent mixture, the separator will be gravity fed. Alternately, the influent mixture may be pumped to the separator 10.

An inlet mixture containing up to 10,000 parts per million (PPM) of oil is easily handled. The difference in the specific gravity of the liquids to be separated should be at least 0.05. Accordingly, oils having specific gravity of up to 0.95 will be easily separated from water.

The size of the tank 20 will be a matter of choice although larger tanks can be used at lower flow rates for more emulsified or heavy oils while smaller ones can be used at higher flow rates.

Once inside of the tank 20, the majority of solids in the mixture will rapidly settle to the bottom of the tank. The kinetic energy of the influent mixture is partially dissipated by being directed against the convex interior of the end of the tank. The direction of the mixture will then move horizontally toward the outlet pipe. The oil droplets will rise and impinge upon the horizontal surface of the coalescing medium. The upper portion of the tank serves as an oil holding reservoir.

Purified water flows up the outlet pipe 38 and out of the outlet nozzle 42. If the inlet nozzle is below the level of the influent source, the separator will be gravity fed.

Whereas, the present invention has been described in relation to the drawings attached hereto, it should be understood that other and further modifications, apart from those shown or suggested herein, may be made within the spirit and scope of this invention.

What is claimed is:

1. A separator device to separate a mixture of immiscible liquids of different densities wherein the lighter of said liquids is in a discontinuous phase, which device comprises:

an elongated container horizontally oriented to the ground having interior convex ends, a top, a bottom, inlet means for receipt of said mixture of immiscible liquids, said inlet means directing flow of said mixture of liquids to impact against one of said convex ends to reduce inlet turbulence of said mixture of immiscible liquids, means to allow separation by gravity of said discontinuous phase liquid, and outlet means near the end of said container opposite the inlet means for removing the heavier of said liquids after separation;

drain means to remove said discontinuous phase liquid after said separation;

means to store said discontinuous phase liquid in said container after separation and prior to removal through said drain means including a valve connected to said drain means and an upstanding pipe extending from said drain means at said bottom of said container and terminating near said top of said container; and randomly arranged, coalescing medium substantially filling said container to encourage coalescence and agglomeration of said discontinuous phase liquid, said coalescing medium including a plurality of buoyant, open, polypropylene particulate media.

2. A separator device as set forth in claim 1 wherein said coalescing medium includes a plurality of buoyant, polypropylene cylindrical rings, each cylindrical ring having an open top and an open bottom, having a plurality of slots in the circumferential surface of said ring.

3. A process to separate a mixture of immiscible liquids of different densities wherein the lighter of said liquids is in a discontinuous phase, which process comprises:

a) directing said mixture of liquids into an elongated container through an inlet;

b) directing said mixture to impact against an interior convex end of said container to reduce inlet turbulence of said mixture of immiscible liquids;

c) allowing said liquids to move vertically within said container by gravity;

d) directing said liquids horizontally within said container toward a heavier liquid outlet near an end of said container opposite said inlet;

e) coalescing and agglomerating said discontinuous phase liquid in said container by randomly arranged, coalescing medium including a plurality of buoyant open polypropylene particulate media substantially filling said container;

f) storing said discontinuous phase liquid in said container after separation and prior to removal through a drain by use of an upstanding pipe extending form said drain at said bottom of said container and terminating near the top of said container and closing a valve connected to said drain; and g) opening said valve and draining and discontinuous phase liquid after separation in said container through said drain.

4. A process to separate a mixture of immiscible liquids of different densities as set forth in claim 3 wherein said coalescing medium includes a plurality of buoyant, polypropylene cylindrical rings, each cylindrical ring having an open top and an open bottom, having a plurality of slots in the circumferential surface of said ring.

* * * * *